April 9, 1929. W. A. EDWARDS Re. 17,261
FUEL LIFTING AND CARBURETING DEVICE
Original Filed Dec. 16, 1918
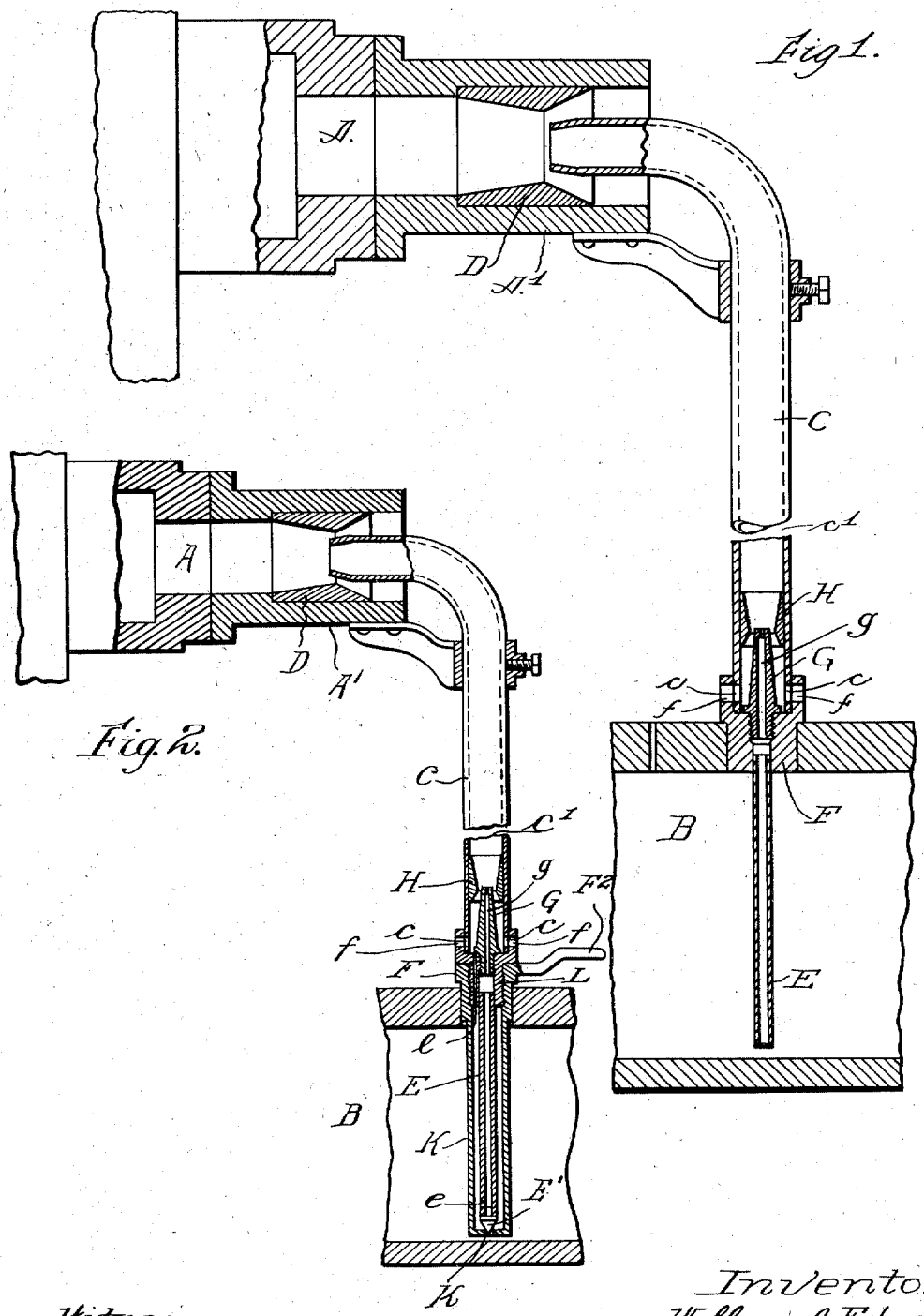
Witness.
A. G. McKnight
Inventor.
William A. Edwards.
by Burton & Burton
his Attorneys.

Reissued Apr. 9, 1929. Re. 17,261

UNITED STATES PATENT OFFICE.

WILLIAM A. EDWARDS, OF CHICAGO, ILLINOIS, ASSIGNOR TO STEWART-WARNER SPEEDOMETER CORPORATION, OF CHICAGO, ILLINOIS, A CORPORATION OF VIRGINIA.

FUEL LIFTING AND CARBURETING DEVICE.

Original No. 1,437,048, dated November 28, 1922, Serial No. 266,906, filed December 16, 1918. Application for reissue filed June 9, 1924. Serial No. 719,021.

The purpose of this invention is to provide an improved construction for lifting liquid fuel from a low level main supply tank and mixing such fuel with air to be fed to an internal combustion engine. It consists in the elements and features of construction shown and described, as indicated in the claims.

In the drawings:

Figure 1 is a partially diagrammatic view showing conventionally a portion of the engine to be served, comprising the intake manifold thereof, a main low level fuel tank, and in axial section the fuel supply and carbureting connections from the tank to the engine intake.

Figure 2 is a view similar to Figure 1, showing a modified form of a characteristic element of the device.

A represents the intake manifold of an internal combustion engine, $A^1$, a pipe fitting for connection with the manifold, B, a main fuel supply tank which is situated at a lower level. C is a pipe which conducts the fuel mixture to the engine intake. D is a Venturi throat piece at the intake through which the fuel mixture is discharged and further aerated. E is a duct which extends down in the main fuel supply tank for receiving the liquid fuel from the lower part of said tank. F is a fitting which is secured in the top of the tank, B, for supporting the duct, E, which depends therefrom into the tank. G is a metering jet nozzle screwed into the fitting, F, and constituting the discharge terminal of the duct, E, said duct discharging through said nozzle terminal within the pipe, C, said pipe, C, being secured also to the fitting, F, and having air inlet apertures, *c*, *c*, registering with apertures, *f*, *f*, in the fitting, F, when the said pipe is protruded into the fitting. H is a Venturi throat-piece fitted within the pipe, C, around the end of the nozzle, G, so that said nozzle discharges in the Venturi throat at a point near and preferably a little beyond the narrowest constriction thereof.

The operation of this device is that when the engine is operating, the partial vacuum produced in the intake manifold by the intake stroke of the piston, produces an inrush of air through the Venturi throat-piece, D, caused both by entrainment and by the direct suction, a partial vacuum in the pipe, C, and produces an inrush of air through the air apertures, *c*, and by entrainment at the tip of the nozzle, G, as well as by the direct suction, causes suction to operate in the pipe, E, for lifting the liquid fuel from the tank, B, and discharging it in a jet through the discharge end of the metering passage, *g*, of the nozzle, G, and the relatively high velocity of air passing the end of the nozzle operates for very effective aspiration of the liquid thus discharged and its thorough mechanical admixture with the air entering through the apertures, *c*, so that the pipe, C, contains substantially a column of vapor, consisting of highly carbureted air which is drawn through the venturi, D, and further mixed with air, producing a proper mixture for explosion in the cylinders of the engine. By reason of the column in the pipe, C, being as stated, vapor or carbureted air, as distinguished from a liquid column, a degree of suction which would be entirely inadequate to lift a liquid column from the low tank to the engine intake, will be quite adequate to draw said vapor column into the intake manifold; and this device, therefore, is adapted to operate for supplying the engine with fuel when running so as to produce a much lower degree of suction than would be sufficient to lift a liquid supply to the same height. The inner diameter of the pipe C being relatively small, it follows that the current movement through it of a given quantity of air or vapor per engine stroke will be relatively rapid, and all of the parts of the connection from the intake manifold to the venturi, H, are dimensioned for obtaining by this means a comparatively high velocity in the pipe, C; and the extent of the pipe, C, from the first venturi, H, to the second venturi, D, being very considerable, as denoted in the conventional manner by the representation of breaking out a part of said pipe, as seen at *c'*, the co-operation of these two features, viz: relatively high speed of air flow and extended path of said flow,—gives opportunity for and results in more complete intermixture of the aspirated or atomized fuel with the air in and by which it is mechanically carried, and tends to offset or counteract the liability to precipitation of the liquid which tends to occur to some extent at the surface of the pipe where the skin friction tends to retard the flow; and the precipitated liquid which adheres to the wall of the pipe and may flow back therein toward the tank is repeatedly picked up by the on-coming air current.

In Figure 2 there is shown a modification, consisting of the provision of a well, K, formed by a pipe extension of the fitting, F, into which the duct, E, extends to the bottom thereof, said well having at the bottom a liquid inlet aperture, *k*. The duct, E, in this modification, is connected to the fitting, F, by means of an intermediate bushing member or threaded sleeve, L, which is screwed into the fitting, F, said bushing member constituting the terminal and immediate connection of the lower end of the pipe, C, and constituting the support for the discharge nozzle, G, of the duct, E. Said bushing member, L, has an air passage, *l*, extending through it, for admitting atmospheric pressure to the well.

The lower end of the duct, E, in this construction is closed by a terminal, $E^1$, which constitutes a valve adapted to close the inlet aperture, *k*, of the well, K, and the inlet to the duct, E, is provided by means of a lateral aperture, *e*, near the lower end of said duct, above said valve terminal. The purpose of the construction shown in this modification is to provide means for adjusting at will the access of liquid fuel from the tank to the feed duct, which is done by rotating the fitting, F, at its seat or bearing in the top wall of the tank, a handle, $F^2$, being provided for this purpose, such rotation operating, as will be readily understood to screw the bushing, K, up or down in the fitting, and thereby open or close the inlet port, *k*, of the well to adjust the opening as found desirable for permitting an adequate supply and preventing an over-supply of liquid fuel to the mixture which is formed in and drawn up through the pipe, C.

I claim:

1. A fuel mixture forming and feeding device comprising in combination with a chamber in which the pressure is sub-atmospheric, a liquid container constituting a source of fuel, a conduit therefrom to said sub-atmospheric pressure chamber, said conduit consisting of a relatively small-diametered duct leading from the lower part of said container; a larger diametered duct within which the smaller duct discharges, said larger duct having an air inlet anterior to the discharge of the first mentioned duct therein, the second mentioned duct having a flow accelerating constriction beyond said air inlet and proximate to the discharge of the first mentioned duct, and a third duct larger than said second duct having an air inlet and a flow-accelerating constriction beyond the same, the second mentioned duct being of substantial length extending from said first mentioned constriction and discharging in said third duct proximate to said second mentioned constriction.

2. A fuel feeding and carbureting device for internal combustion engines comprising a container constituting a source of liquid fuel; a conduit therefrom to the engine intake comprising an initial member having liquid intake at the lower part of the container, and a discharge terminal of relatively small flow capacity, a second conduit member of substantial longitudinal extent within which said terminal discharges near to and not below the highest level which the liquid can reach in the container, said second conduit member having an air inlet adjacent to the discharge of said terminal therein, and a flow-accelerating constriction proximate to which said terminal discharges, said conduit also comprising a final conduit member leading to the engine having a second flow-accelerating constriction, said final member being open to atmosphere anterior to said constriction, the second mentioned conduit member being terminated for discharge within said constricted portion of said final member.

3. A fuel feeding and carbureting device for internal combustion engines comprising a low level fuel supply tank and a conduit therefrom to the engine intake, said conduit consisting of a duct leading from the lower part of the tank; a larger pipe within which said duct opens near the level of the tank, said larger pipe having an air inlet adjacent to the discharge of said duct therein, a venturi in the conduit leading to the engine intake open to atmosphere at its intake end, the discharge end of said larger pipe terminating for discharge within the constricted portion of said venturi.

4. In the construction defined in claim 3, the duct having a terminal discharge nozzle with restricted aperture for the liquid fuel jet delivered therethrough, and the air inlet of the larger pipe being located back of the discharge mouth of said nozzle.

5. In the construction defined in claim 3, the outer or larger pipe having a Venturi throat-way at the part into which the duct discharge terminal protrudes, and having an air inlet back of the Venturi throat.

6. In a fuel feeding and carbureting device for an internal combustion engine, comprising a low-level fuel supply tank and conduit therefrom to the engine intake, said conduit consisting of a duct leading from a lower part of the tank and a larger pipe within which said duct opens near the level of the tank, said larger pipe having an air intake adjacent to the discharge of said duct therein, and having a Venturi throat near the constriction of which the duct discharges, said constriction being beyond the said air inlet into said larger pipe.

7. In combination with a tank from which liquid is to be drawn by engine suction, an air-conducting pipe having an air inlet adjacent the top of the tank; means for conducting the liquid prior to the point of air intermixture comprising a well suspended from the tank having a liquid inlet from the tank, a liquid conducting pipe suspended from the air conducting pipe, and depending in the well, having a liquid inlet port; means for controlling the liquid inlet to the well, and means operable at will for relative adjustment of the inlet ports and the inlet-controlling means.

8. In the construction defined in claim 7 foregoing, the liquid-inlet controlling means being carried by said depending liquid conducting pipe, and the well being adjustable relatively to said pipe for controlling the liquid inlet.

9. In the construction defined in claim 7 foregoing, both the well and the liquid conducting pipe being suspended from the air conducting pipe, the inlet port of the well being at the bottom end thereof, the liquid-conducting pipe having at its bottom end a valve for controlling said port, the well being adjustably carried at its connection with the liquid-conducting pipe, and means outside the tank for adjusting it vertically at said connection.

In testimony whereof, I have hereunto set my hand at Chicago, Illinois, this 4th day of June, 1924.

WILLIAM A. EDWARDS.